United States Patent
Kayama et al.

(10) Patent No.: US 6,898,439 B2
(45) Date of Patent: May 24, 2005

(54) RADIO COMMUNICATION DEVICE AND TRANSMISSION POWER CONTROL METHOD

(75) Inventors: Hidenori Kayama, Yokosuka (JP); Masaki Hayashi, Yokosuka (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 642 days.

(21) Appl. No.: 09/890,072

(22) PCT Filed: Nov. 29, 2000

(86) PCT No.: PCT/JP00/08407

§ 371 (c)(1),
(2), (4) Date: Jul. 26, 2001

(87) PCT Pub. No.: WO01/41481

PCT Pub. Date: Jun. 7, 2001

(65) Prior Publication Data

US 2003/0060225 A1 Mar. 27, 2003

(30) Foreign Application Priority Data

Nov. 30, 1999 (JP) .......................................... 11-340727

(51) Int. Cl.[7] ................................................ H04B 7/00
(52) U.S. Cl. ......................... 455/522; 455/69; 455/13.4
(58) Field of Search ........................ 455/522, 69, 13.4, 455/33.1, 70, 436

(56) References Cited

U.S. PATENT DOCUMENTS 5,386,589 A * 1/1995 Kanai ........................... 455/423
6,070,084 A * 5/2000 Hamabe ....................... 455/522
6,341,224 B1 * 1/2002 Dohi et al. ................... 455/522

FOREIGN PATENT DOCUMENTS

| JP | 05244056 | 9/1993 |
|---|---|---|
| JP | 09261170 | 10/1997 |
| JP | 10079724 | 3/1998 |
| JP | 11243363 | 9/1999 |
| JP | 2000 138633 | 5/2000 |
| WO | 9750197 | 7/1998 |

OTHER PUBLICATIONS

International Search Report dated Mar. 6, 2001.

* cited by examiner

*Primary Examiner*—Nick Corsaro
*Assistant Examiner*—Tan Trinh
(74) *Attorney, Agent, or Firm*—Stevens, Davis, Miller & Mosher, LLP

(57) ABSTRACT

A CRC judgment section 103 performs a CRC check on decoded data every transmission unit, and if there is an error in the data, updates a flag held in a flag holding section 106 from 0 to 1; an increment/decrement value calculation section 105 calculates a reference SIR increment/decrement value according to the state (0 or 1) of the flag; a reference SIR update section 107 adds the reference SIR increment/decrement value to the current reference SIR value to find a new reference SIR value; a comparison section 109 compares the received signal SIR value measured by an SIR measurement section 108 with the updated reference SIR value, and a transmission power control bit generation section 110 generates a transmission power control bit according to the result of the comparison.

12 Claims, 8 Drawing Sheets

RADIO COMMUNICATION DEVICE AND TRANSMISSION POWER CONTROL METHOD

TECHNICAL FIELD

The present invention relates to a radio communication apparatus and transmission power control method.

BACKGROUND ART

In a CDMA (Code Division Multiple Access) mobile communication system, transmission power control is an important technology from the standpoint of expanding system capacity. One transmission power control method is the outer loop transmission power control method. With the outer loop transmission power control method, mobile station apparatuses and a base station apparatus vary the reference SIR (Signal to Interference Ratio) according to quality that varies according to the propagation environment in order to maintain the receiving line quality (abbreviated to "quality" below), such as the FER (Frame Error Rate) for example, at a constant level, and transmission power control is performed in accordance with the result of comparing that variable reference SIR with the reception SIR. The reason for varying the reference SIR so that mobile station apparatuses and the base station apparatus maintain quality at a constant level is that, since transmission of excessive quality causes a slight increase in interference with other stations, it is necessary to transmit at the minimum transmission power that satisfies the required quality.

A conventional radio communication apparatus that performs outer loop transmission power control will be described below. FIG. 1 is a principal block diagram showing the outline configuration of the reception system of a conventional radio communication apparatus. In FIG. 1, a demodulation section 11 performs predetermined demodulation processing on a received signal. A decoding section 12 decodes data after demodulation.

A CRC judgment section 13 performs a CRC (Cyclic Redundancy Check) on decoded data, judges whether or not there is an error in the data, and outputs data after judgment in decoding units. If an error is detected (if CRC=NG), an increment/decrement value calculation section 14 generates a reference SIR increment value S1, expressed by equation (1) below. If an error is not detected (if CRC=OK), the increment/decrement value calculation section 14 generates a reference SIR decrement value S2, expressed by equation (2) below.

$$S1 = 0.5[dB] \quad (1)$$

$$S2 = -S1 * \text{FER\_TARGET}/(1 - \text{FER\_TARGET})[dB] \quad (2)$$

$$\text{FER\_TARGET} = 10^{-3} \text{(in case of voice communication)}$$
$$= 10^{-4} \text{(in case of data communication)}$$

Equations (1) and (2) above are computational equations generally used as reference SIR increment/decrement value computational equations in outer loop transmission power control. FER_TARGET indicates the Frame Error Rate (quality) that it is wished to maintain at a constant level for the radio communication apparatus.

A reference SIR update section 15 updates the reference SIR value by adding a reference SIR increment/decrement value determined by above equation (1) or (2) to the current reference SIR value. The update cycle is generally the CRC judgment cycle of 10 ms. The updated reference SIR value is output to a comparison section 17.

The comparison section 17 compares the received signal SIR value measured by an SIR measurement section 16 with the updated reference SIR value, and outputs the result of the comparison to a transmission power control bit generation section 18. If the measured SIR value is larger than the reference SIR value, the transmission power control bit generation section 18 generates a transmission power control bit directing the communicating party to decrease transmission power. If the measured SIR value is equal to or smaller than the reference SIR value, the transmission power control bit generation section 18 generates a transmission power control bit directing the communicating party to increase transmission power.

The transmission power control bit generation section 18 then outputs the generated transmission power control bit to the transmission system of the radio communication apparatus. In the transmission system, the transmission power control bit is mapped onto the transmit signal. The communicating party adjusts the transmission power according to the received transmission power control bit. Conventionally, outer loop transmission power control is performed in this way between radio communication apparatuses.

However, there is a problem with the conventional radio communication apparatus and outer loop transmission power control method, as follows.

FIG. 2 is a drawing showing variations in the reference SIR when outer loop transmission power control is performed using a conventional radio communication apparatus. FIG. 2 shows the case of an 80 ms decoding unit and 10 ms frame: that is, the case where eight CRC judgments (1) to (8) are performed at 10 ms intervals within 80 ms. Time is shown on the horizontal axis and reference SIR values on the vertical axis.

If an error is detected in CRC judgments (3) to (5) (if CRC=NG), a reference SIR increment value S1 is calculated with equation (1) above. That is to say, in CRC judgments (3) to (5) the reference SIR values are each incremented by 0.5 [dB].

If an error is not detected in CRC judgments (6) to (8) (if CRC=OK), a reference SIR decrement value S2 is calculated with equation (2) above as shown below.

$$S2 = -0.5 * 10^{-4}/(1-10^{-4}) \approx -0.5/10000 \, [dB] \quad (3)$$

where $\text{FER\_TARGET} = 10^{-4}$ (in case of data communication)

That is to say, in CRC judgments (6) to (8) the reference SIR values are each decremented by approximately $0.5/10000$ [dB].

As can be seen from the result of equation (3) above, the reference SIR values are decremented on an extremely gentle gradient. Therefore, with a conventional radio communication apparatus, once the receive data quality becomes excessive, an extremely long time is required for the reference SIR value to be set to the optimum reference SIR value. That is, with a conventional radio communication apparatus, the time during which data is transmitted at excessive transmission power is extremely long, and therefore interference with other stations increases and system capacity decreases.

DISCLOSURE OF INVENTION

It is an objective of the present invention to provide a radio communication apparatus and transmission power control method that make it possible to prevent a decrease in system capacity arising due to excessive transmission power.

The inventors of the present invention perceived that the cause of the time during which data is transmitted at excessive transmission power being extremely long is that the difference between the reference SIR value increment width and the reference SIR value decrement width is extremely large.

In order to achieve the above-described objective, in the present invention the difference between the reference SIR value increment width and the reference SIR value decrement width is considered in advance, the increment width is adjusted so that the reference SIR value does not increase too much, and if the reference SIR value does increase too much, the decrement width is increased in accordance with the increment width.

BEST MODE FOR CARRYING OUT THE INVENTION

Embodiments of the present invention will be described specifically below with reference to accompanying drawings.
(Embodiment 1)

A radio communication apparatus according to Embodiment 1 of the present invention increments the reference SIR value by a predetermined amount once only within a decoding unit, and after performing the increment once, for subsequent frames decrements the reference SIR value by a predetermined amount even if there is deemed to be an error.

Figure 1:
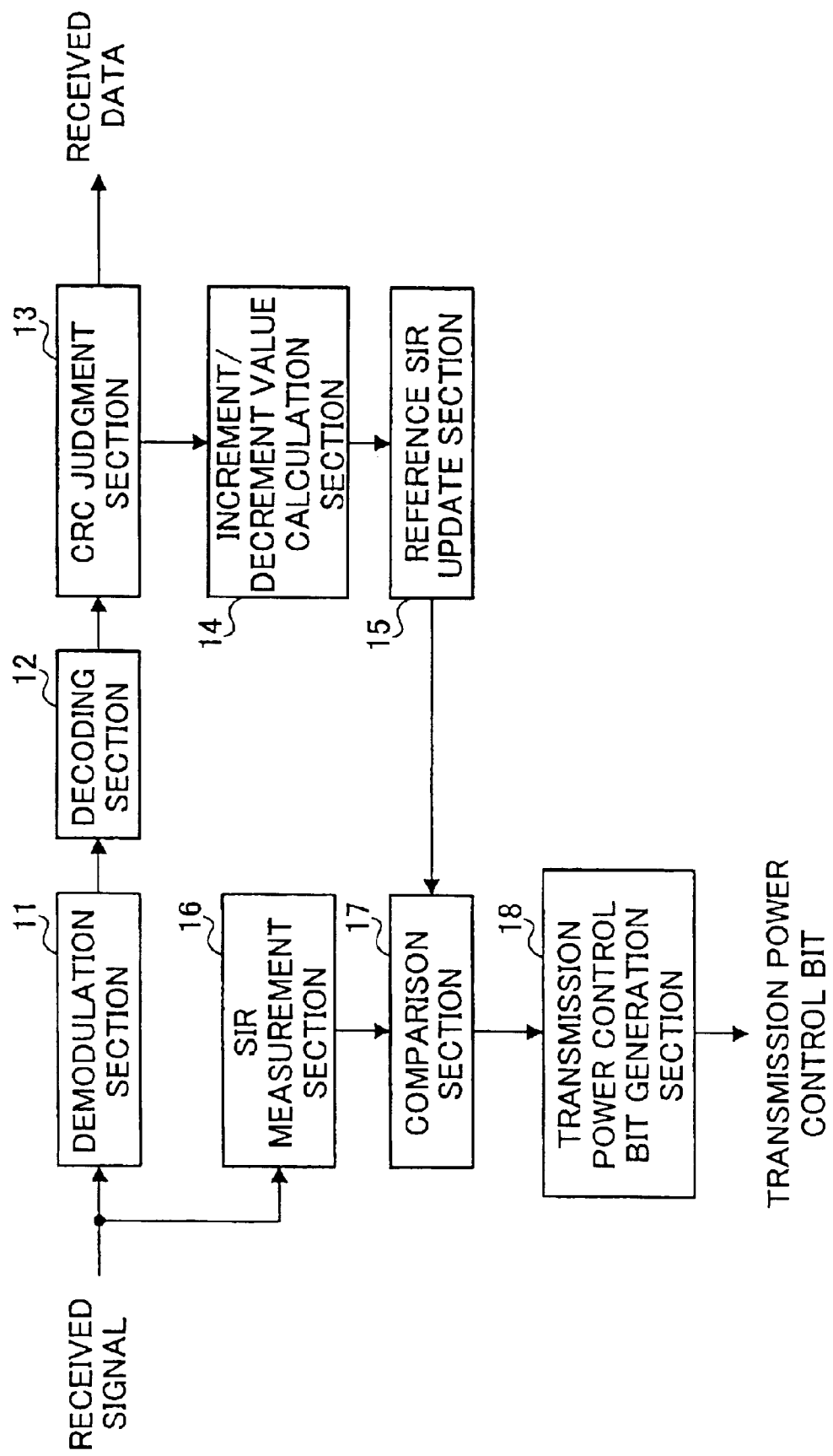
FIG. 1 is a principal block diagram showing the outline configuration of the reception system of a conventional radio communication apparatus.
Figure 2:
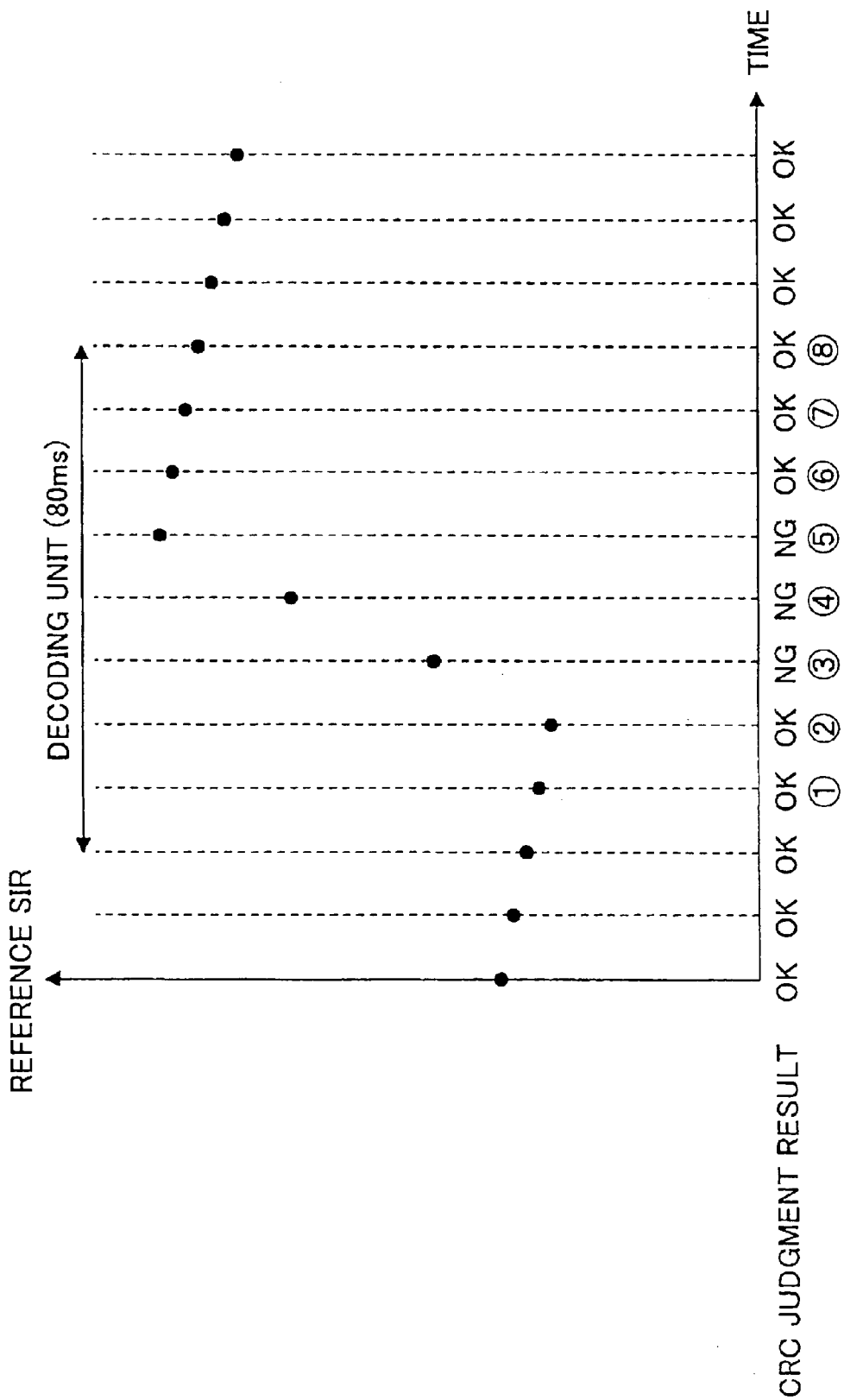
FIG. 2 is a drawing showing variations in the reference SIR when outer loop transmission power control is performed using a conventional radio communication apparatus.
Figure 3:
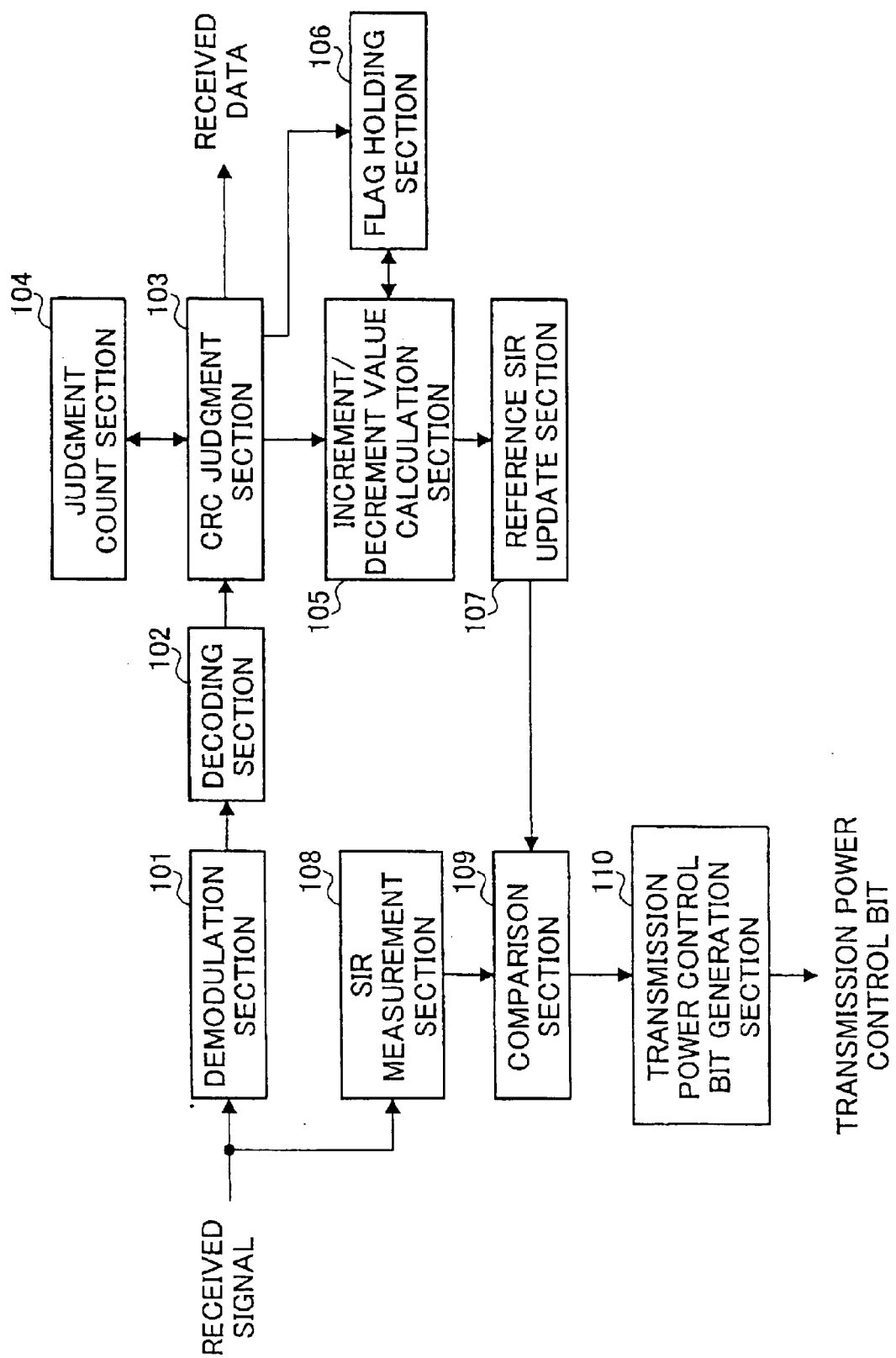
FIG. 3 is a principal block diagram showing the outline configuration of the reception system of a radio communication apparatus according to Embodiment 1 of the present invention.

A radio communication apparatus and transmission power control method according to Embodiment 1 of the present invention will be described below. FIG. 3 is a principal block diagram showing the outline configuration of the reception system of a radio communication apparatus according to Embodiment 1 of the present invention.

In FIG. 3, a demodulation section 101 performs predetermined demodulation processing on a received signal. A decoding section 102 performs decoding of data after demodulation. A CRC judgment section 103 performs a CRC on the decoded data, judges whether or not there is an error in the data, and outputs receive data after judgment in decoding units. The number of CRC judgments to be performed per decoding unit is set in advance in a judgment count section 104. For example, if the decoding unit is 80 ms and the transmission unit is 10 ms per frame, the number of CRC judgments is set as 8. The judgment count section 104 is for counting the number of CRC judgments.

An increment/decrement value calculation section 105 calculates a reference SIR increment/decrement value in accordance with the state (0 or 1) of a flag held in a flag holding section 106. A reference SIR update section 107 holds the current reference SIR value. The reference SIR update section 107 adds the reference SIR increment/decrement value determined by the increment/decrement value calculation section 105 to the current reference SIR value to find a new reference SIR value. The reference SIR update section 107 then updates the current reference SIR value with that new reference SIR value, and outputs that updated reference SIR value to a comparison section 109.

The comparison section 109 compares the received signal SIR value measured by an SIR measurement section 108 with the updated reference SIR value, and outputs the result of the comparison to a transmission power control bit generation section 110. If the measured SIR value is larger than the reference SIR value, the transmission power control bit generation section 110 generates a transmission power control bit directing the communicating party to decrease transmission power. It the measured SIR value is equal to or smaller than the reference SIR value, the transmission power control bit generation section 110 generates a transmission power control bit directing the communicating party to increase transmission power.

The transmission power control bit generation section 110 then outputs the generated transmission power control bit to the transmission system of the radio communication apparatus. In the transmission system, the transmission power control bit is mapped onto the transmit signal. The communicating party adjusts the transmission power according to the received transmission power control bit. In this way, outer loop transmission power control is performed between radio communication apparatuses.

Figure 4:
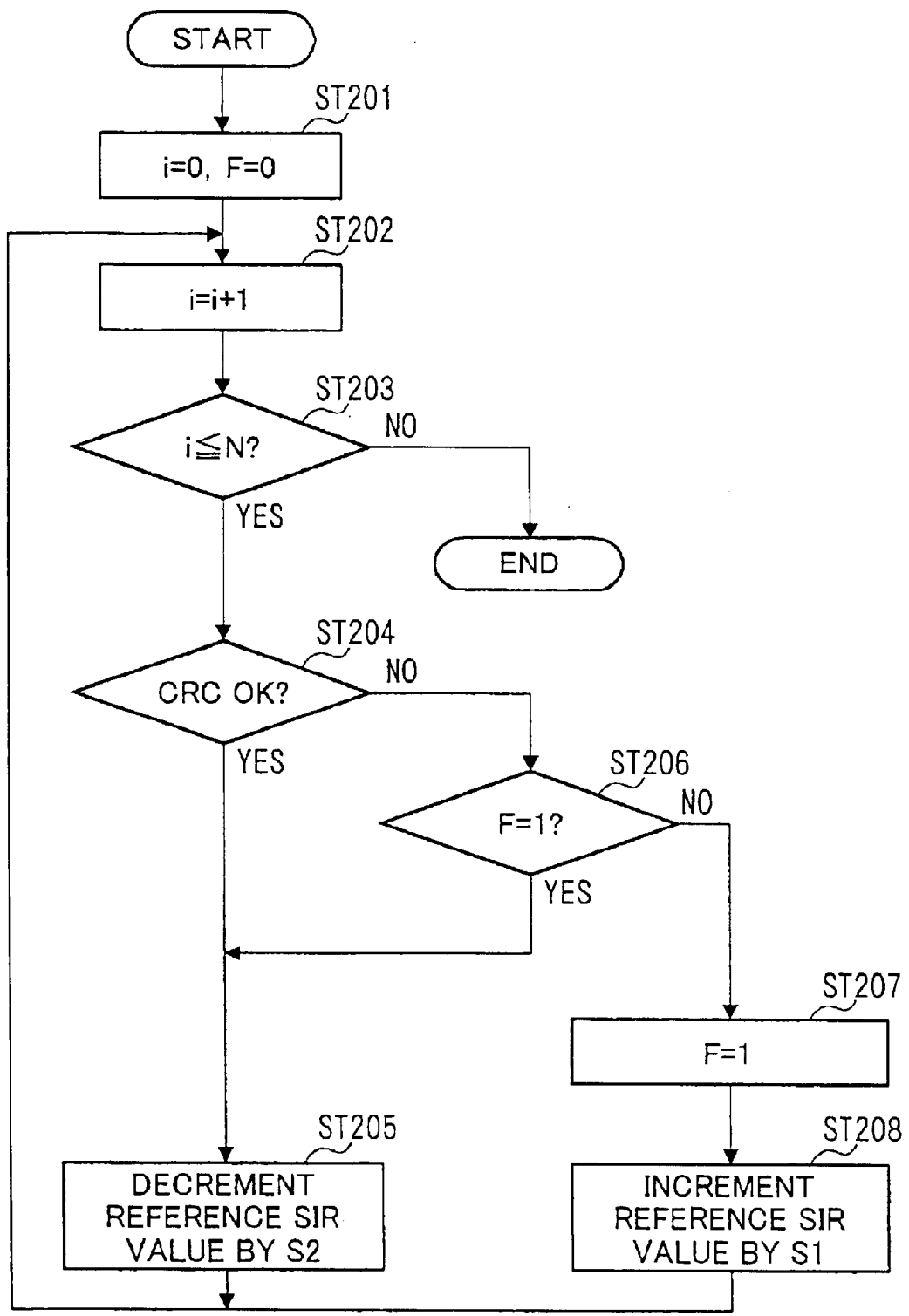
FIG. 4 is a flowchart for explaining the operation of the reception system of a radio communication apparatus according to Embodiment 1 of the present invention.

Next, the operation of the reception system of a radio communication apparatus having the above-described configuration will be described using FIG. 4. FIG. 4 is a flowchart for explaining the operation of the reception system of a radio communication apparatus according to Embodiment 1 of the present invention.

When decoded data is output from the decoding section 102 in decoding units, first, in step (abbreviated to "ST" below) 201, the CRC judgment section 103 resets the number of CRC judgments i held in the judgment count section 104 to 0, and also resets a flag F held in the flag holding section 106 to 0. In the flowchart in FIG. 4, the number of CRC judgments to be performed per decoding unit is indicated by "N". In the following description, the case is shown where the decoding unit is 80 ms and the transmission unit is 10 ms per frame: that is, the case where eight CRC judgments are performed at 10 ms intervals within 80 ms. Here, therefore, "N" has been set to 8 in advance in the judgment count section 104. In the following description, "N" is called "the maximum number of CRC judgments."

Next, in ST202, the CRC judgment section 103 increments by 1 the number of CRC judgments i held in the judgment count section 104.

Then, in ST203, the judgment count section 104 compares the number of CRC judgments i with the maximum number of CRC judgments N. If i N, the judgment count section 104 directs the CRC judgment section 103 to perform CRC judgment for the i'th frame of decoded data in a decoding unit. In this case, the procedure advances to ST204.

If, on the other hand, i N is not true in ST203 (that is, if the number of CRC judgments i exceeds the maximum number of CRC judgments N), the judgment count section 104 directs the CRC judgment section 103 to output decoded data in decoding units. By this means, the CRC judgment section 103 outputs receive data every decoding unit.

Next, in ST204, the CRC judgment section 103 judges whether or not there is an error in the decoded data, and outputs a signal indicating the presence or absence of an error to the increment/decrement value calculation section 105.

If there is no error in ST204 (if CRC=OK), in ST205 the increment/decrement value calculation section 105 generates a reference SIR decrement value S2 in accordance with equations (4) and (5) below, and outputs the generated reference SIR decrement value S2 to the reference SIR update section 107. Following this, the procedure returns to ST202, and the processing is repeated.

$$S1 = 0.5 [dB] \quad (4)$$

$$S2 = -S1 * FER\_TARGET/(1 - FER\_TARGET)[dB] \quad (5)$$

FER_TARGET indicates the Frame Error Rate (quality) that it is wished to maintain at a constant level for the radio communication apparatus. FER_TARGET is generally set to $10^{-3}$ in the case of speech communication and to $10^{-4}$ in the case of data communication.

If, on the other hand, there is an error in ST204 (if CRC=NG), in ST206 the increment/decrement value calculation section 105 references the state of the flag F held in the flag holding section 106. If F=0, the increment/decrement value calculation section 105 updates F to 1 in ST207, and then in ST208 generates a reference SIR increment value S1 in accordance with equation (4) above, and outputs the generated reference SIR increment value S1 to the reference SIR update section 107. If F=1, in ST205 the increment/decrement value calculation section 105 performs the same processing as when there is no error (when CRC=OK). The procedure then returns to ST202, and the processing is repeated.

When the above operations are performed, after the flag F is set to 1, the reference SIR value continues to be decremented by the decrement width S2 even if there is an error(if CRC=NG). That is to say, within a decoding unit the reference SIR value is incremented by the increment width S1 once only, and after being incremented once, the reference SIR value is decremented by the decrement width S2 even if an error occurs in a subsequent frame. Therefore, looking at each decoding unit, the reference SIR value increment width is held down to S1 or below, and therefore the reference SIR value rises on a gentler gradient than with a conventional radio communication apparatus and transmission power control method, making it possible to reduce beforehand the extent to which the receive data quality becomes excessive.

Figure 5:
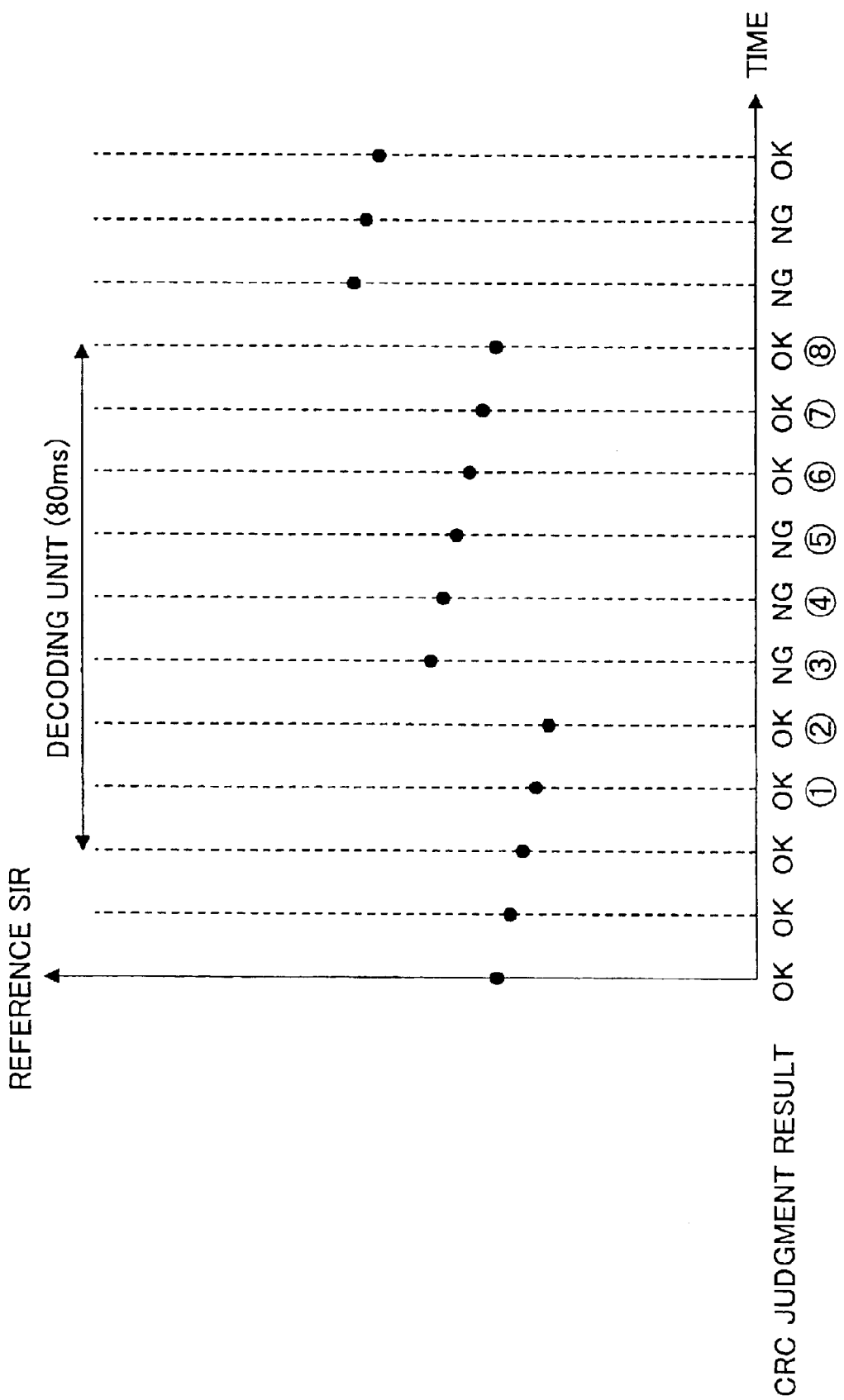
FIG. 5 is a drawing showing variations in the reference SIR when outer loop transmission power control is performed using a radio communication apparatus according to Embodiment 1 of the present invention.

Next, variations in the reference SIR when outer loop transmission power control is performed using a radio communication apparatus having the above-described configuration will be described using FIG. 5. FIG. 5 is a drawing showing variations in the reference SIR when outer loop transmission power control is performed using a radio communication apparatus according to Embodiment 1 of the present invention.

FIG. 5 shows the case of an 80 ms decoding unit and a transmission unit of 10 ms per frame: that is, the case where eight CRC judgments (1) to (8) are performed at 10 ms intervals within 80 ms. Time is shown on the horizontal axis and reference SIR values on the vertical axis.

If an error is detected in CRC judgment (3) (if CRC=NG), the reference SIR value is incremented by the increment width S1.

Following this, even if an error is detected (if CRC=NG) in CRC judgment (4) or (5) the reference SIR value is decremented by the decrement width S2, since the reference SIR value has been incremented once within a decoding unit in CRC judgment (3).

Thus, in CRC judgments (1) to (8) within a decoding unit, incrementing of the reference SIR value by the increment width S1 is performed once only in CRC judgment (3), and in all CRC judgments other than CRC judgment (3) the reference SIR value is decremented by the decrement width S2.

Now, above equations (4) and (5) used in this embodiment are only examples, and the equations are not limited to these. Therefore, above equation (4) can be any equation as long as it is an equation expressing a reference SIR increment value. Also, above equation (5) can be any equation as long as it is an equation expressing a reference SIR decrement value.

Moreover, in this embodiment, incrementing of the reference SIR is performed only once within a decoding unit. However, the number of times the reference SIR is incremented within a decoding unit is not limited to this, and it is also possible to use a total of two or more increment widths per time for the reference SIR value.

Thus, according to this embodiment, within a decoding unit, incrementing of the reference SIR value by a predetermined amount is performed a predetermined number of times (for example, once) only, and after incrementing is performed the predetermined number of times, the reference SIR value is decremented by a predetermined amount even if there is an error in a subsequent frame. Therefore, since the reference SIR value rises on a gentler gradient than with a conventional radio communication apparatus and transmission power control method, it is possible to reduce beforehand the extent to which the receive data quality becomes excessive. As a result, it is possible to shorten the time during which data is transmitted at excessive transmission power.

(Embodiment 2)

A radio communication apparatus according to this embodiment differs from a radio communication apparatus according to Embodiment 1 in that, within a decoding unit, the reference SIR value decrement width is varied adaptively according to the number of times the reference SIR value is incremented by a predetermined amount.

Figure 6:
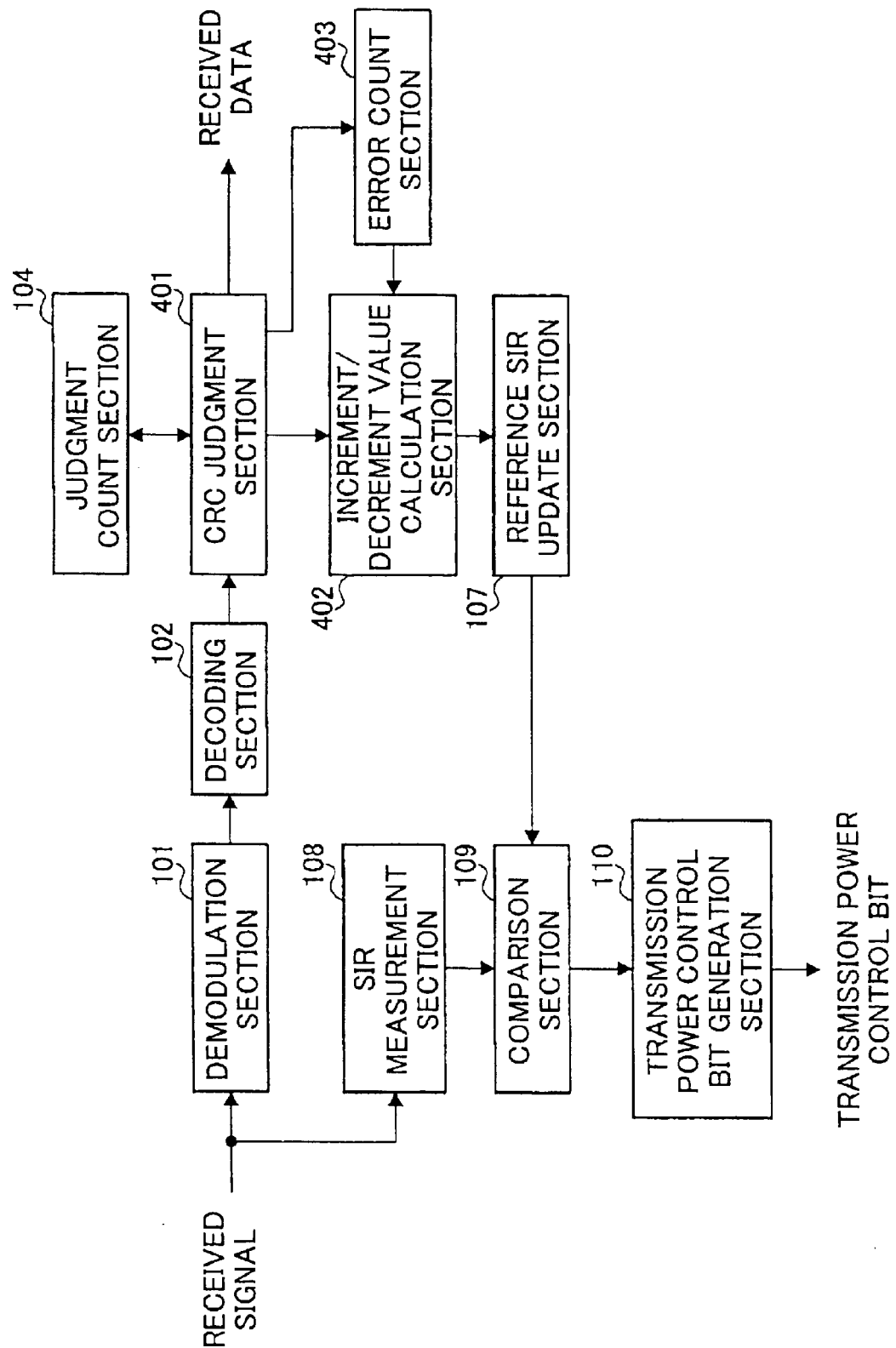
FIG. 6 is a principal block diagram showing the outline configuration of the reception system of a radio communication apparatus according to Embodiment 2 of the present invention.

A radio communication apparatus according to Embodiment 2 of the present invention will be described below. FIG. 6 is a principal block diagram showing the outline configuration of the reception system of a radio communication apparatus according to Embodiment 2 of the present invention. The parts in FIG. 6 identical to those in FIG. 3 are assigned the same numbers as in FIG. 3, and their detailed explanations are omitted.

In FIG. 6, a CRC judgment section 401 performs a CRC on decoded data, judges whether or not there is an error in the data, and outputs receive data after judgment in decoding units. An increment/decrement value calculation section 402 calculates a reference SIR increment/decrement value in accordance with the number of errors within a decoding unit held in an error count section 403.

Figure 7:
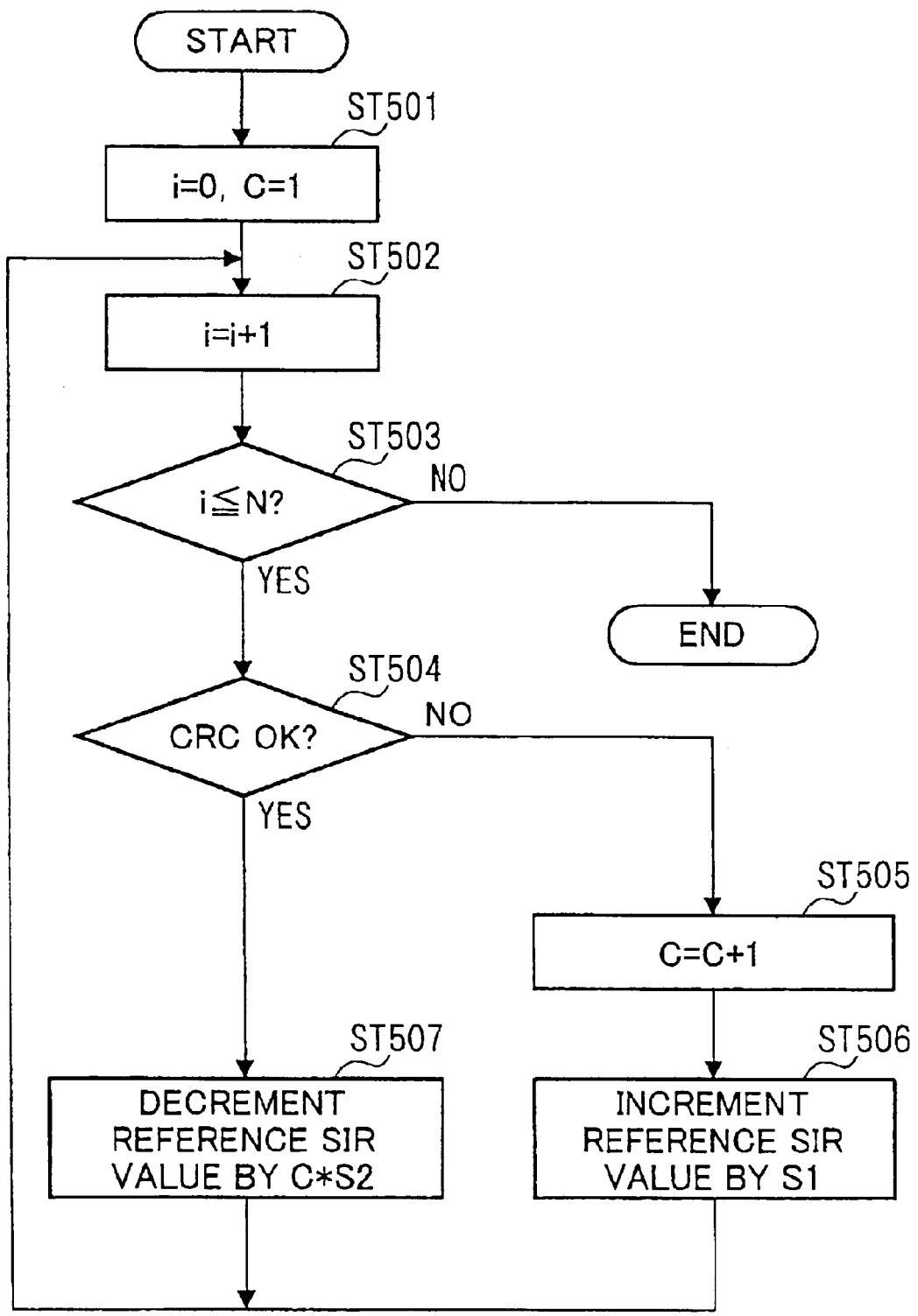
FIG. 7 is a flowchart for explaining the operation of the reception system of a radio communication apparatus according to Embodiment 2 of the present invention.

Next, the operation of the reception system of a radio communication apparatus having the above-described configuration will be described using FIG. 7. FIG. 7 is a flowchart for explaining the operation of the reception system of a radio communication apparatus according to Embodiment 2 of the present invention. A detailed explanation of steps for which the operation is identical to that in 4 is omitted.

When decoded data is output from the decoding section 102 in decoding units, first, in ST501, the CRC judgment section 103 resets the number of CRC judgments i held in the judgment count section 104 to 0, and resets a counter C held in the error count section 403 to 1.

Next, in ST502, the CRC judgment section 401 increments by 1 the number of CRC judgments i held in the judgment count section 104.

Then, in ST503, the judgment count section 104 compares the number of CRC judgments i with the maximum number of CRC judgments N. If i N, the judgment count section 104 directs the CRC judgment section 401 to perform CRC judgment for the i'th frame of decoded data in a decoding unit. In this case, the procedure advances to ST504.

If, on the other hand, i N is not true in ST503 (that is, if the number of CRC judgments i exceeds the maximum number of CRC judgments N), the judgment count section 104 directs the CRC judgment section 401 to output decoded data in decoding units. By this means, the CRC judgment section 401 outputs receive data every decoding unit.

Next, in ST504, the CRC judgment section 401 judges whether or not there is an error in the decoded data, and outputs a signal indicating the presence or absence of an error to the increment/decrement value calculation section 402.

If there is an error in ST504 (if CRC=NG), in ST505 the CRC judgment section 401 increments by 1 the counter C held in the error count section 403. Then, in ST506, the increment/decrement value calculation section 402 generates a reference SIR increment value S1 in accordance with equation (4) above, and outputs the generated reference SIR increment value S1 to the reference SIR update section 107. Following this, the procedure returns to ST502, and the processing is repeated.

If, on the other hand, there is no error in ST504 (if CRC=OK), in ST507 the increment/decrement value calculation section 402 generates a reference SIR decrement value S2' in accordance with equation (6) below, and outputs the generated reference SIR decrement value S2' to the reference SIR update section 107. The procedure then returns to ST202, and the processing is repeated.

$$S2'=C*S2 \text{ expressed by above equation (5) [dB]} \qquad (6)$$

If there is no error in the decoded data (if CRC=OK) when the above operations are performed, the reference SIR value is decremented by a decrement width that is in accordance with the number of errors detected up to that time within a decoding unit. That is to say, the more times the reference SIR value has been incremented by a predetermined amount, the larger is the decrement width per time for the reference SIR value. Therefore, the reference SIR value falls at a steeper gradient than with a conventional radio communication apparatus and transmission power control method, with the result that the time during which receive data quality is excessive is greatly shortened compared with a conventional radio communication apparatus and transmission power control method.

Now, above equation (6) used in this embodiment is only an example, and the equation is not limited to this. Therefore, above equation (6) can be any equation as long as it is an equation expressing the fact that the more times the reference SIR value has been incremented by a predetermined amount within a decoding unit, the larger is the reference SIR decrement value.

Figure 8:
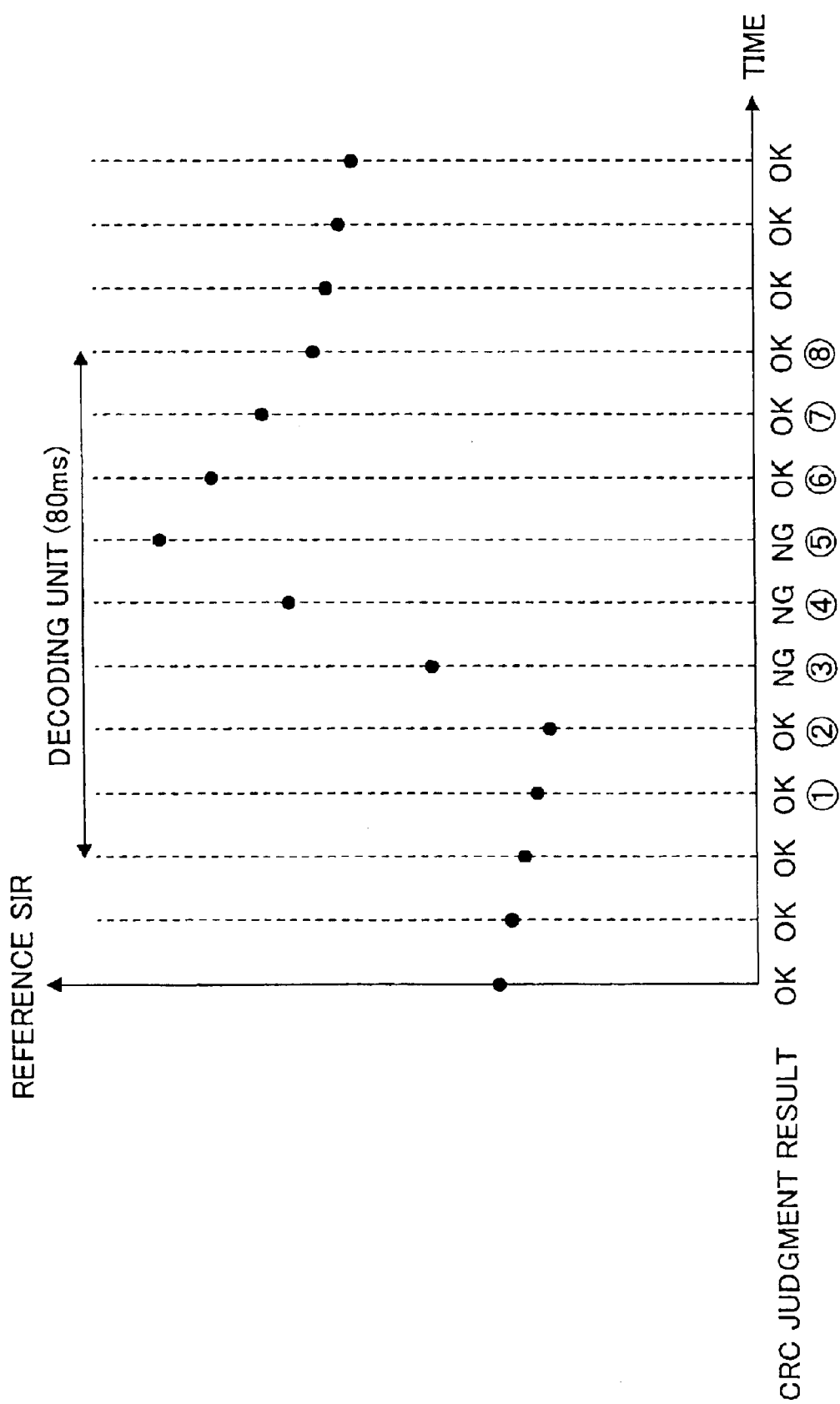
FIG. 8 is a drawing showing variations in the reference SIR when outer loop transmission power control is performed using a radio communication apparatus according to Embodiment 2 of the present invention.

Next, variations in the reference SIR when outer loop transmission power control is performed using a radio communication apparatus having the above-described configuration will be described using FIG. 8. FIG. 8 is a drawing showing variations in the reference SIR when outer loop transmission power control is performed using a radio communication apparatus according to Embodiment 2 of the present invention.

FIG. 8 shows the case of an 80 ms decoding unit and a transmission unit of 10 ms per frame: that is, the case where eight CRC judgments (1) to (8) are performed at 10 ms intervals within 80 ms. Time is shown on the horizontal axis and reference SIR values on the vertical axis.

If an error is detected in CRC judgments (3) to (5) (if CRC=NG), the reference SIR values are incremented by the increment width S1.

Following this, if an error is not detected in CRC judgments (6) to (8) (if CRC=OK), the reference SIR values are decremented by a decrement width S2' that is in accordance with the number of errors detected up to that time within a decoding unit. To be specific, in CRC judgments (6) to (8), the reference SIR value is decremented at a gradient four times that in the case of a conventional radio communication apparatus and transmission power control method.

Thus, according to this embodiment, within a decoding unit the decrement width of the reference SIR value is varied adaptively according to the number of times the reference SIR value has been incremented by a predetermined amount, enabling the time during which receive data quality is excessive to be greatly shortened compared with a conventional radio communication apparatus and transmission power control method.

In above-described Embodiment 1 and Embodiment 2, SIR values are used as a reference value and measured values, but this is not a limitation. That is to say, any value, such as the reception level, for example, can be used as a reference value and measured values, as long as it is a value that indicates reception quality.

It is also possible for above-described Embodiment 1 and Embodiment 2 to be implemented in combination.

Also, a radio communication apparatus according to above-described Embodiment 1 or Embodiment 2 can be applied to a communication terminal apparatus or base station apparatus in a mobile communication system. When applied, the time during which data is transmitted at excessive transmission power by a communication terminal apparatus or base station apparatus can be shortened, making it possible to prevent a decrease in the system capacity of a mobile communication system.

According to the present invention, as described above, it is possible to prevent a decrease in system capacity arising due to excessive transmission power.

This application is based on the Japanese Patent Application No.HEI 11-340727 filed on Nov. 30, 1999, entire content of which is expressly incorporated by reference herein.

What is claimed is:

1. A radio communication apparatus comprising:
   a decoder that performs decoding processing on reception data every decoding unit, said reception data including a plurality of transmission units in said decoding unit;
   a judging unit that judges a presence or absence of an error in the decoded reception data every transmission unit;
   an updater that increments or decrements a reference value of a reception quality according to said presence or absence of an error to update said reference value; and
   a generator that generates a transmission power control bit according to a result of comparison of the updated reference value and a measured reception quality, wherein
   within each decoding unit, the number of times said updater increments said reference value is less than the number of transmission units having an error.

2. The radio communication apparatus of claim 1, wherein, within each decoding unit, said updater increments said reference value only when an error is first detected.

3. The radio communication apparatus of claim 1, wherein, within each decoding unit, said updater increments said reference value only once.

4. The radio communication apparatus of claim 1, wherein said updater, after having incremented said reference value a predetermined number of times, decrements said reference value even when the transmission unit has an error.

5. A communication terminal apparatus comprising the radio communication apparatus of claim 1.

6. A base station apparatus comprising the radio communication apparatus of claim 1.

7. A radio communication apparatus, comprising:
   a decoder that performs decoding processing on reception data every decoding unit, said reception data including a plurality of transmission units in said decoding unit;
   a judging unit that judges a presence or absence of an error in the decoded reception data every transmission unit;
   an updater that increments or decrements a reference value of a reception quality according to said presence or absence of an error to update said reference value; and
   a generator that generates a transmission power control bit according to a result of comparison of the updated reference value and a measured reception quality, wherein
   within each decoding unit, said updater decrements said reference value by a decrement width that is in accordance with the number of times said reference value is incremented.

8. The radio communication apparatus of claim 7, wherein said updater increases the decrement width proportionately as the number of times said reference value is incremented increases.

9. A communication terminal apparatus comprising the radio communication apparatus of claim 7.

10. A base station apparatus comprising the radio communication apparatus of claim 7.

11. A transmission power control method comprising:
    performing decoding processing on reception data every decoding unit, said reception data including a plurality of transmission units in said decoding unit;
    judging a presence or absence of an error in the decoded reception data every transmission unit;
    incrementing or decrementing a reference value of a reception quality according to said presence or absence of an error to update said reference value; and
    generating a transmission power control bit according to a result of comparison of the updated reference value and a measured reception quality, wherein
    within each decoding unit, the number of times said reference value is incremented is less than the number of transmission units having an error.

12. A transmission power control method comprising:
    performing decoding processing on reception data every decoding unit, said reception data including a plurality of transmission units in said decoding unit;
    judging a presence or absence of an error in the decoded reception data every transmission unit;
    incrementing or decrementing a reference value of a reception quality according to said presence or absence of an error to update said reference value; and
    generating a transmission power control bit according to a result of comparison of the updated reference value and a measured reception quality, wherein
    within each decoding unit, said reference value is decremented by a decrement width that is in accordance with the number of times said reference value is incremented.

* * * * *